(12) United States Patent
Kim et al.

(10) Patent No.: US 7,370,161 B2
(45) Date of Patent: May 6, 2008

(54) BANK ARBITER SYSTEM WHICH GRANTS ACCESS BASED ON THE COUNT OF ACCESS REQUESTS

(75) Inventors: Young-Duk Kim, Suwon-si (KR);
Kyoung-Mook Lim, Yongin-si (KR);
Jong-Min Lee, Seoul (KR);
Seh-Woong Jeong, Seoul (KR);
Jae-Hong Park, Seongnam-si (KR)

(73) Assignee: Samsung Electronics Co., Ltd,
Suwon-si, Gyeonggi-do (KR)

( * ) Notice: Subject to any disclaimer, the term of this patent is extended or adjusted under 35 U.S.C. 154(b) by 520 days.

(21) Appl. No.: 10/995,820

(22) Filed: Nov. 23, 2004

(65) Prior Publication Data

US 2005/0132146 A1 Jun. 16, 2005

(30) Foreign Application Priority Data

Dec. 13, 2003 (KR) .................. 10-2003-0090944

(51) Int. Cl.
*G06F 12/00* (2006.01)

(52) U.S. Cl. ..................... 711/158; 711/5; 711/105; 711/145; 711/151; 711/163; 710/36; 710/40; 710/113; 710/116; 710/123; 710/240; 710/244; 365/230.03

(58) Field of Classification Search ............ 711/158, 711/5, 105, 145, 151, 163; 710/36, 40, 113, 710/116, 123, 240, 244; 365/230.03
See application file for complete search history.

(56) References Cited

U.S. PATENT DOCUMENTS

| | | | | | |
|---|---|---|---|---|---|
| 4,237,534 | A | * | 12/1980 | Felix | 710/123 |
| 4,314,335 | A | * | 2/1982 | Pezzi | 710/243 |
| 4,384,323 | A | * | 5/1983 | Ahuja | 710/241 |
| 4,514,728 | A | * | 4/1985 | Ahuja | 710/113 |
| 4,760,515 | A | * | 7/1988 | Malmquist et al. | 710/121 |
| 5,083,260 | A | * | 1/1992 | Tsuchiya | 710/113 |
| 5,440,713 | A | * | 8/1995 | Lin et al. | 711/158 |
| 5,586,299 | A | * | 12/1996 | Wakerly | 711/149 |
| 5,796,968 | A | * | 8/1998 | Takamiya | 710/113 |
| 6,026,464 | A | * | 2/2000 | Cohen | 711/5 |
| 6,892,289 | B2 | * | 5/2005 | Moss | 711/167 |
| 2004/0006665 | A1 | * | 1/2004 | Moss | 711/5 |
| 2004/0006666 | A1 | * | 1/2004 | Moss | 711/5 |

FOREIGN PATENT DOCUMENTS

| | | |
|---|---|---|
| JP | 4-225459 | 8/1992 |
| JP | 5-89027 | 4/1993 |

* cited by examiner

*Primary Examiner*—Stephen C. Elmore
(74) *Attorney, Agent, or Firm*—F. Chau & Associates, LLC

(57) ABSTRACT

Provided are an arbiter capable of improving memory access efficiency in a multi-bank memory, a memory access arbitration system including the arbiter, and an arbitration method thereof, where the arbiter detects requests that are not included in a busy bank, and allows the requests corresponding to a bank receiving the largest number of pending requests priorities; and write request information generated by masters is stored in a predetermined buffer to be output as additional master request information, and provides the corresponding master with an opportunity to generate new request information.

19 Claims, 6 Drawing Sheets

US 7,370,161 B2

BANK ARBITER SYSTEM WHICH GRANTS ACCESS BASED ON THE COUNT OF ACCESS REQUESTS

CROSS-REFERENCE TO RELATED APPLICATION

This application claims foreign priority under 35 U.S.C. § 119 to Korean Patent Application No. 2003-90944, filed on Dec. 13, 2004, in the Korean Intellectual Property Office, the disclosure of which is incorporated herein by reference in its entirety.

BACKGROUND OF THE INVENTION

1. Field of the Invention

The present invention relates to memory access, and more particularly, to an arbiter that arbitrates access of a multi-bank memory.

2. Description of the Related Art

In an application system supporting a multi-bank memory such as a synchronous dynamic random access memory (SDRAM) or a double data rate (DDR)-SDRAM, a system on chip (SOC) for video or audio requires high memory bandwidth. In order for the SOC to have higher memory bandwidth, increases are needed in arbitration efficiency of a memory bus as well as in system clock speed. That is, in an access arbitration in the multi-bank memory, when masters such as a micro-control unit (MCU) and an ARM core (a microchip of ARM Inc.), for example, access the banks included in the memory, the arbitration should be performed so as to allow the masters to access grants efficiently and perform an interleaving bank arbitration process. The masters transfer information to write data on the memory or to read the data stored in the memory, and to access the banks.

A conventional arbiter uses a simple way to arbitrate the requests of the masters accessing the banks in the memory. That is, in a bank interleaving method, requests that are not accesses to busy banks are detected from pending requests, and access grants are allowed to the masters. The busy bank is a bank performing a read or write operation among the banks in the memory, and the read or write operation is performed during predetermined cycles of the system clock. In addition, in a read/write turn-around time minimizing method, requests that have the same direction as those of the previous access are detected among the pending requests, and these requests are granted. In addition, in a same row access detection method, requests that are to access a row of the memory cell array the same as an active row of the busy bank are detected, and the grants are given to the requests.

Since the memory bank is in the busy state during predetermined cycles of the system clock when the memory bank is accessed, the above memory bank can be accessed again when the bank is released from the busy state. During a time when a certain bank is in the busy state, other banks that are not in busy states are accessed.

FIG. 1A is a view illustrating a conventional accessing method to the multi-bank memory, indicated generally by the reference numeral 100. Referring to FIGS. 1A through 1C, each figure represents a normal case, indicated generally by the reference numerals 100, 120 and 140, respectively. The first case 100 has an overhead cycle, and the second case 120 also has an overhead cycle. Here, it is assumed that the busy state of the bank is maintained for three access times (ATs). The case 100 of FIG. 1A is a case where the bank 0 is accessed again after a 3AT period has elapsed since the first access, and a normal bank interleaving operation is performed without the overhead cycle. In (b) of FIG. 1, a request for accessing bank 0 is generated again within a 1AT period before the busy state of the bank 0 is released, and the access to the bank 0 should be made after passing the overhead cycle of 1AT in order to access the bank 0 after accessing to the bank 1, because the busy state of the accessed bank is maintained for a 3AT period. Like the case 120, in the case 140 there is a request for accessing the bank 0 within a 2AT period before the busy state of the bank 0 is released, and the access to the bank 0 should be made after passing the overhead cycle of the 2AT period. In the conventional method of accessing the multi-bank memory, many overhead cycles happen when the accessing order to the multi-banks is not arbitrated appropriately, thus, the system speed is lowered, and accordingly, the high memory bandwidth required in the application system cannot be satisfied.

SUMMARY OF THE INVENTION

The present disclosure provides an arbiter that arbitrates accesses to multi-bank memory, where the arbiter performs an effective bank-interleaving operation by detecting requests that are not included in a busy bank and allowing the requests corresponding to a bank receiving the largest number of pending request priorities, or storing write request information generated by masters in a predetermined buffer to be output as additional master request information and providing the corresponding master with an opportunity to generate new request information.

Embodiments of the present disclosure also provide a multi-bank memory access arbitration system. Additional embodiments of the present disclosure also provide a multi-bank memory access arbitration method.

According to an aspect of the present disclosure, there is provided a multi-bank memory access arbiter for receiving request information from a plurality of masters, calculating the number of access requests to each of banks from the request information that is to access the banks except a busy bank, and allowing the masters, which want to access the bank receiving the largest number of access requests, access grants of higher priorities.

According to another aspect of the present disclosure, there is provided a multi-bank memory access arbiter for receiving request information from a plurality of masters, storing write request information temporarily, and allowing the masters corresponding to the request information, which is received from the masters to access the banks except a busy bank, and the temporarily stored write request information to access the bank in an access grant determination process.

According to another aspect of the present disclosure, there is provided a multi-bank memory access arbitration system including a plurality of masters that output request information; an arbiter that receives the request information, calculates the number of access requests at each of banks from the request information, which access to the banks except the busy bank, and gives access grants to the masters, which access to the bank receiving the largest number of access requests, to select and output the request information; an interface control unit that processes the selected request information to output memory access control information; and a multi-bank memory unit that accesses to the bank in response to the memory access control information to read the data or write the data.

According to a yet another aspect of the present disclosure, there is provided a multi-bank memory access arbitration method including: receiving request information from a plurality of masters; calculating the number of access requests at each of banks from the request information that is to access the banks excepts a busy bank; and allowing the masters that access to the bank receiving the largest number of access requests to access the bank with higher priority.

According to a yet another embodiment of the present disclosure, there is provided a multi-bank memory access arbitration method including: receiving request information from a plurality of masters; storing write request information temporarily; and allowing the masters corresponding to the request information, which is output from the masters and is to access banks except a busy bank, and the temporarily stored write request information to access the banks.

BRIEF DESCRIPTION OF THE DRAWINGS

The above and other features and advantages of the present disclosure will become more apparent by describing in detail exemplary embodiments thereof with reference to the attached drawings, in which.

DETAILED DESCRIPTION OF PREFERRED EMBODIMENTS

Figure 1A:
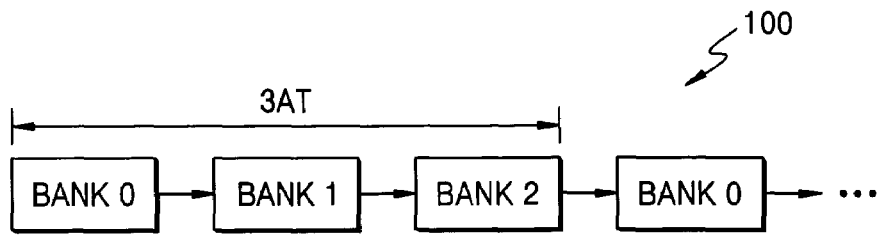
FIG. 1 is a view describing a conventional accessing method to a multi-bank memory.

The attached drawings for illustrating preferred embodiments of the present disclosure are referred to in order to gain a sufficient understanding of the present disclosure, the merits thereof, and the advantages accomplished by implementations of the present disclosure.

Hereinafter, the present disclosure will be described in detail by explaining preferred embodiments of the disclosure with reference to the attached drawings. Like reference numerals in the drawings may denote like elements.

Figure 2:
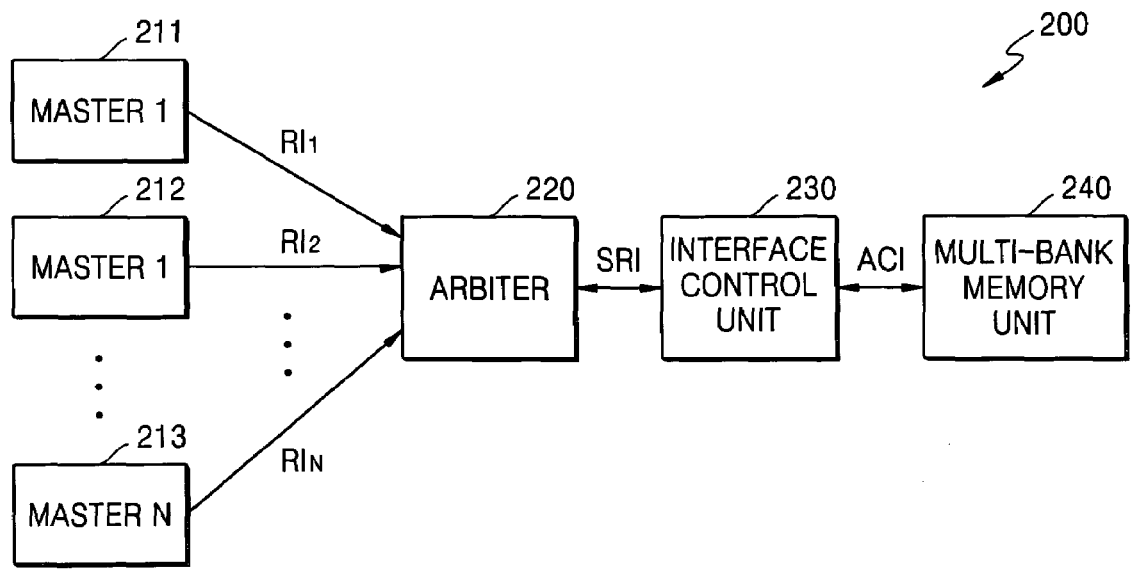
FIG. 2 is a block diagram illustrating a memory access arbitration system including an arbiter according to the present disclosure.

FIG. 2 is a block diagram illustrating a memory access arbitration system including an arbiter according to the present disclosure, indicated generally by the reference numeral 200. Referring to FIG. 2, the memory access arbitration system including the arbiter includes a plurality of masters 211 through 213, an arbiter 220, an interface control unit 230, and a multi-bank memory unit 240.

The plurality of masters 211-213 output request information $RI_1$-$RI_N$ for occupying a bus. The masters 211-213 generally refer to devices that access the multi-bank memory unit 240 to store data in the multi-bank memory unit 240 or read the data stored in the multi-bank memory unit 240. In a system such as a digital versatile disc (DVD) player, a system control device such as a micro-control unit (MCU) or an ARM core (a microchip of ARM Inc.) for example, corresponds to the master 211-213, and in addition to the above devices, there may be various other masters that are to access the multi-bank memory unit 240. The masters 211-213 output read request information to read the data stored in the multi-bank memory unit 240, and output write request information to store the data in the multi-bank memory unit 240.

The arbiter 220 selects request information having higher priority among the request information $RI_1$-$RI_N$ output by the masters 211-213, and outputs the selected request information (SRI). The interface control unit 230 processes the selected request information SRI and outputs memory access control information ACI. The ACI includes signals that control the multi-bank memory unit 240 so that the corresponding data can be read or stored in the multi-bank memory unit 240. The signals include a row address signal (RAS) that selects a row line of a memory cell array, a column address signal (CAS) that selects a column line, and a precharge control signal for controlling a semiconductor memory device such as a synchronous dynamic random access memory (SDRAM), a double data rate (DDR)-SDRAM, or a flash random access memory (FRAM) of multi-bank memory form. The multi-bank memory unit 240 accesses a bank corresponding to the ACI in response to the ACI, and outputs read data or write data. The multi-bank memory unit 240 may include stacked type banks, where each of the banks is a memory cell array including a plurality of memory cells. The stack type multi-bank memory may be applied to many application systems requiring speedup operations.

Figure 3:
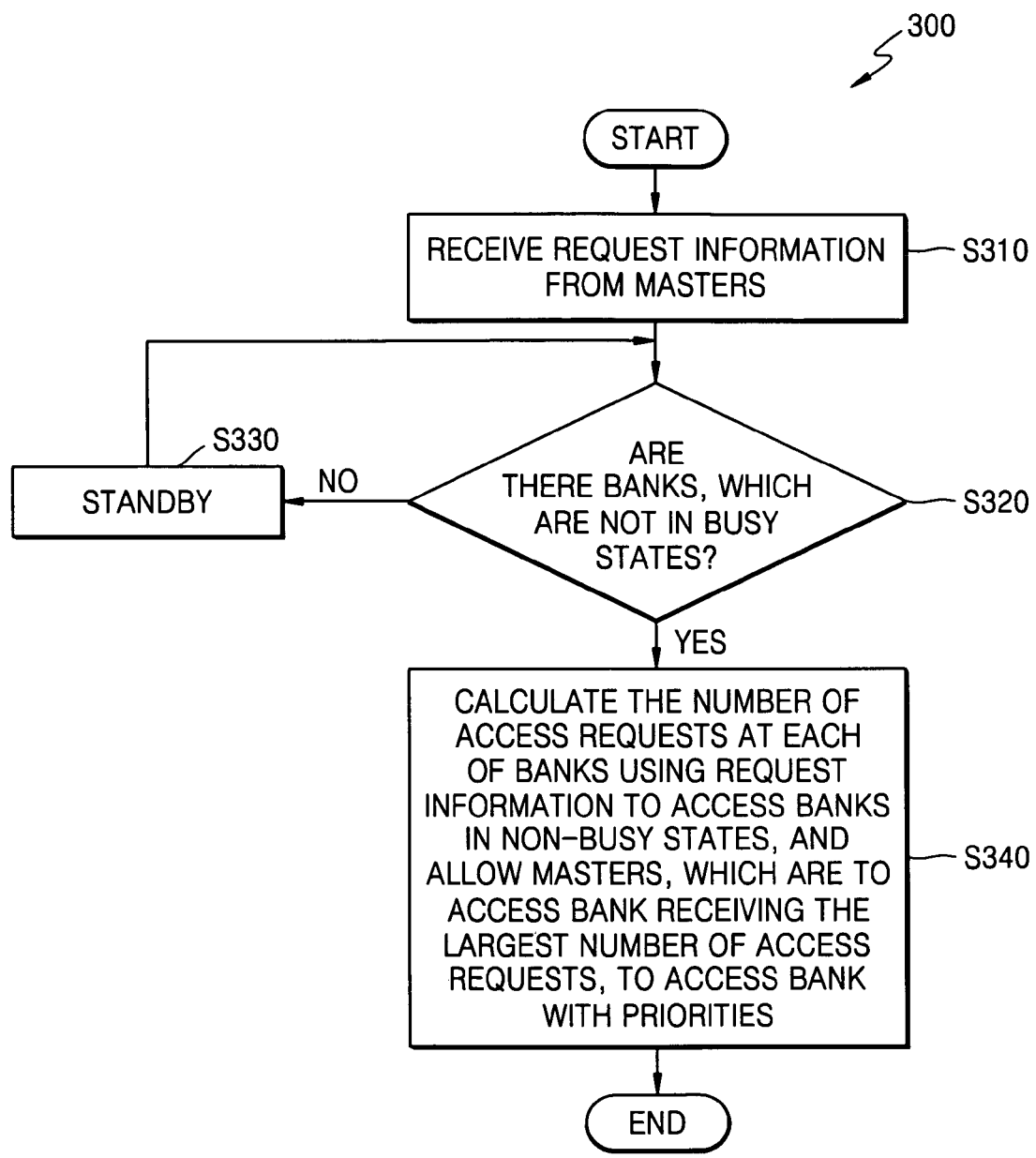
FIG. 3 is a flow chart describing operations of the arbiter shown in FIG. 2.

Each of the banks cannot be accessed by two or more masters 211-213 simultaneously, and when the bank is once accessed, a series of access time (AT) is used, during which the bank is controlled by the RAS, CAS, and the precharge control signal. Thus, in order to operate the banks effectively, the memory access arbitration process with respect to the masters is used. The bank that is accessed by one of the masters 211-213 is a busy bank, and the busy bank has lower priority than those of other banks that are not in the busy states in determining the next access grant by the arbiter 220. That is, the arbiter 220 predicts the AT of the busy bank, and allows the master higher priority that is to access the bank that is not in the busy state. FIG. 3 is a flow chart describing operations of the arbiter 220 shown in FIG. 2, indicated generally by the reference numeral 300. Referring to FIG. 3, in step 310 and 320, when the arbiter 220 of FIG. 2 receives the request information $RI_1$-$RI_N$ from the masters 211-213, the arbiter 220 checks whether there is a bank not in the busy state. In step 330, if the all banks of the multi-bank memory unit 240 are in the busy states, the arbiter 220 orders the accesses of the masters 211-213 to standby. If there is a bank that is not in the busy state in the multi-bank memory unit 240, the arbiter 220 grants the priorities to the request information $RI_1$-$RI_N$ output by the masters 211-213 as follows. That is, the number of access requests to each of the banks, which are not the busy banks, is calculated using the request information $RI_1$-$RI_N$, and the access grants having higher priorities are allowed to the masters that will access the bank receiving the largest number of access requests (S340). Accordingly, when the master receives the access grant having the highest priority, the arbiter 220 selects the request information of that master and outputs the SRI.

For example, it is assumed that the arbiter 220 calculates the number of access requests to each of the banks from the request information $RI_1$-$RI_N$ output from the masters 211-213 as shown in table 1. In addition, the multi-bank memory unit 240 includes four banks.

TABLE 1

| Bank number | The number of access requests |
|---|---|
| 0 | 1 |
| 1 | 2 |
| 2 | 1 |
| 3 | 0 |

Here, since the number of access requests to the bank 1 is the largest, the arbiter 220 allows the higher priorities to the two masters that will access the bank 1. It is not important that which one of the two masters receives higher priority than that of another one.

Figure 1B:
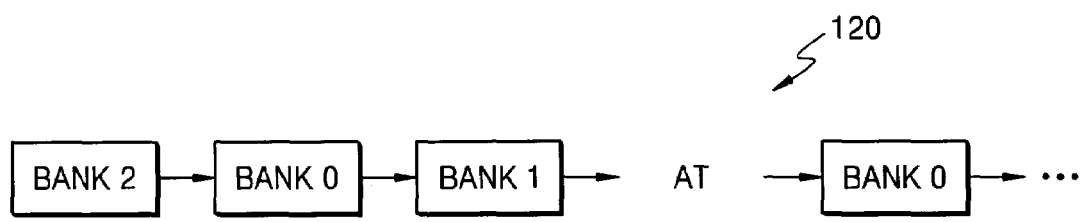
Figure 1C:
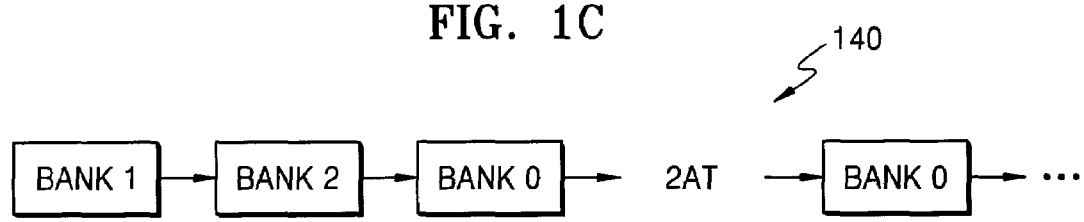
Figure 4A:
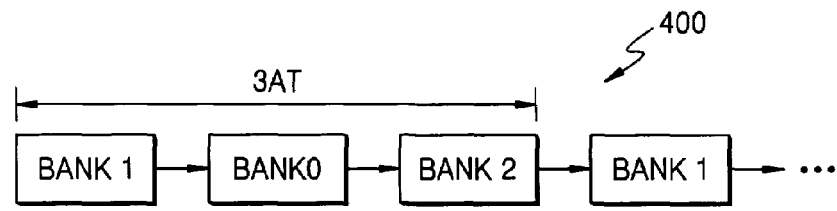
FIG. 4 is a view describing operations of the arbiter of FIG. 2 that arbitrates accesses to the multi-bank memory.
Figure 4B:
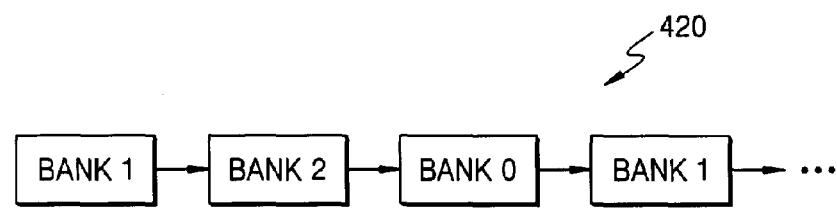

As shown in FIGS. 4A and 4B, and indicated generally by the reference numerals 400 and 420, respectively, the arbiter 220 arbitrates the access requests so that the bank 1 can be accessed first. That is, the arbiter 220 arbitrates the accessed order of the banks to be "bank1"-"bank0"-"bank2"-"bank1", or "bank1"-"bank2"-"bank0"-"bank1". Here, it is assumed that the busy state of the bank is maintained during 3ATs like in FIG. 1. Thus, in the above example, if the higher priority is not granted to the master accessing the bank 1, that is, if the accessing order of the banks is set as "bank0"-"bank1"-"bank2"-"bank1", the bank 1 is accessed again within 3AT-period since the bank 1 is accessed first. In the second access to the bank 1, overhead cycle happens because the master should wait until the busy state of the bank 1 is released. However, since the arbiter 220 of FIG. 2 according to the present disclosure grants higher priority to the masters that are to access the bank, which receives more access requests, the effective bank interleaving operation can be performed. The arbitration method according to the present disclosure can support the read/write turn-around time minimize method, and the same row access detection method as well as the bank interleaving method. Thus, the memory bus arbitration efficiency is improved, and the memory bandwidth can rise.

Figure 5:
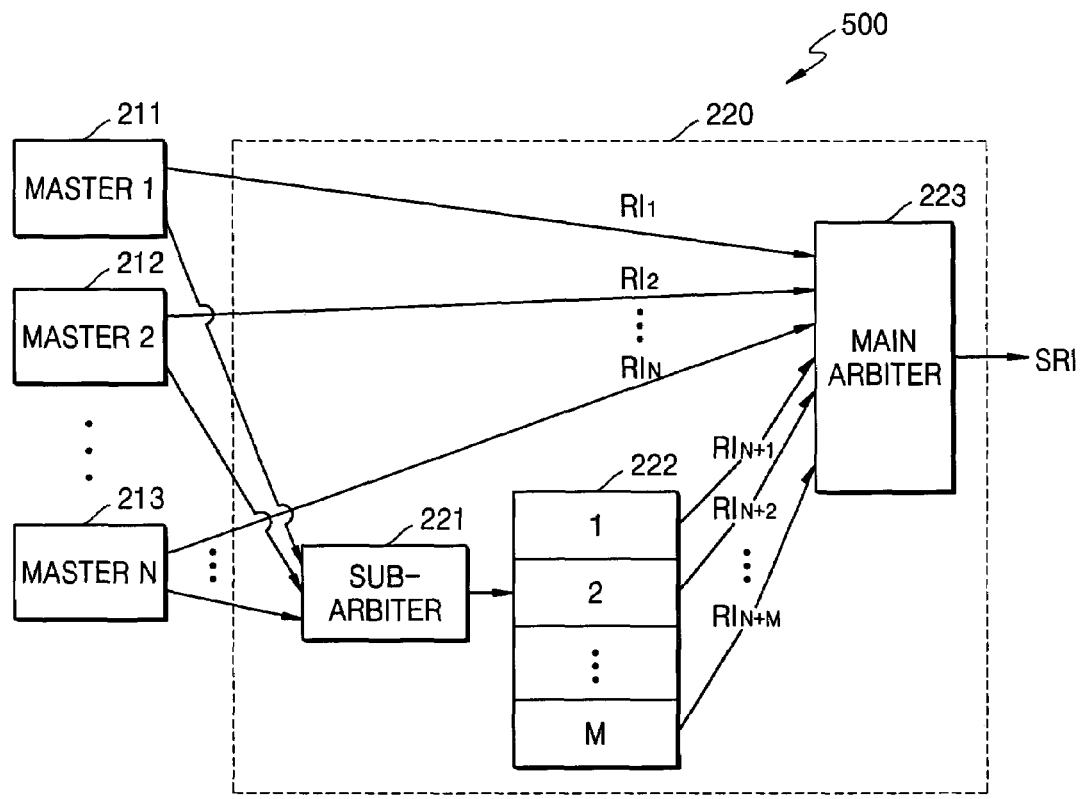
FIG. 5 is a block diagram illustrating the arbiter of FIG. 2 that includes a write buffer in detail.

FIG. 5 is a block diagram illustrating the arbiter 220 of FIG. 2 having a write buffer 222 in more detail, indicated generally by the reference numeral 500. Referring to FIG. 5, the arbiter 220 includes a sub-arbiter 221, a write buffer 222, and a main arbiter 223.

The sub-arbiter 221 receives the request information $RI_1$-$RI_N$ from the masters 211-213, selects some write request information, and outputs the selected write request information. The request information $RI_1$-$RI_N$ includes write request information and read request information. When the write request information cannot be granted the access grant by the main arbiter 223 directly, but can access the write buffer 222, the sub-arbiter 221 makes the write buffer 222 temporarily store the request information.

The write request information $RI_{N+1}$-$RI_{N+M}$ that is temporarily stored in the write buffer 222 are output as additional master request information at next grant determination of the main arbiter 223. That is, the master selected by the sub-arbiter 221 writes the corresponding write request information in the write buffer 222, and thereby, generates new request information besides the write request information stored in the write buffer 222 at the next time of the next grant determination operation. The write request information $RI_{N+1}$-$RI_{N+M}$ temporarily stored in the write buffer 222 includes the information requesting the access grant and the data that will be written and stored in the multi-bank memory unit 240.

Figure 6A:
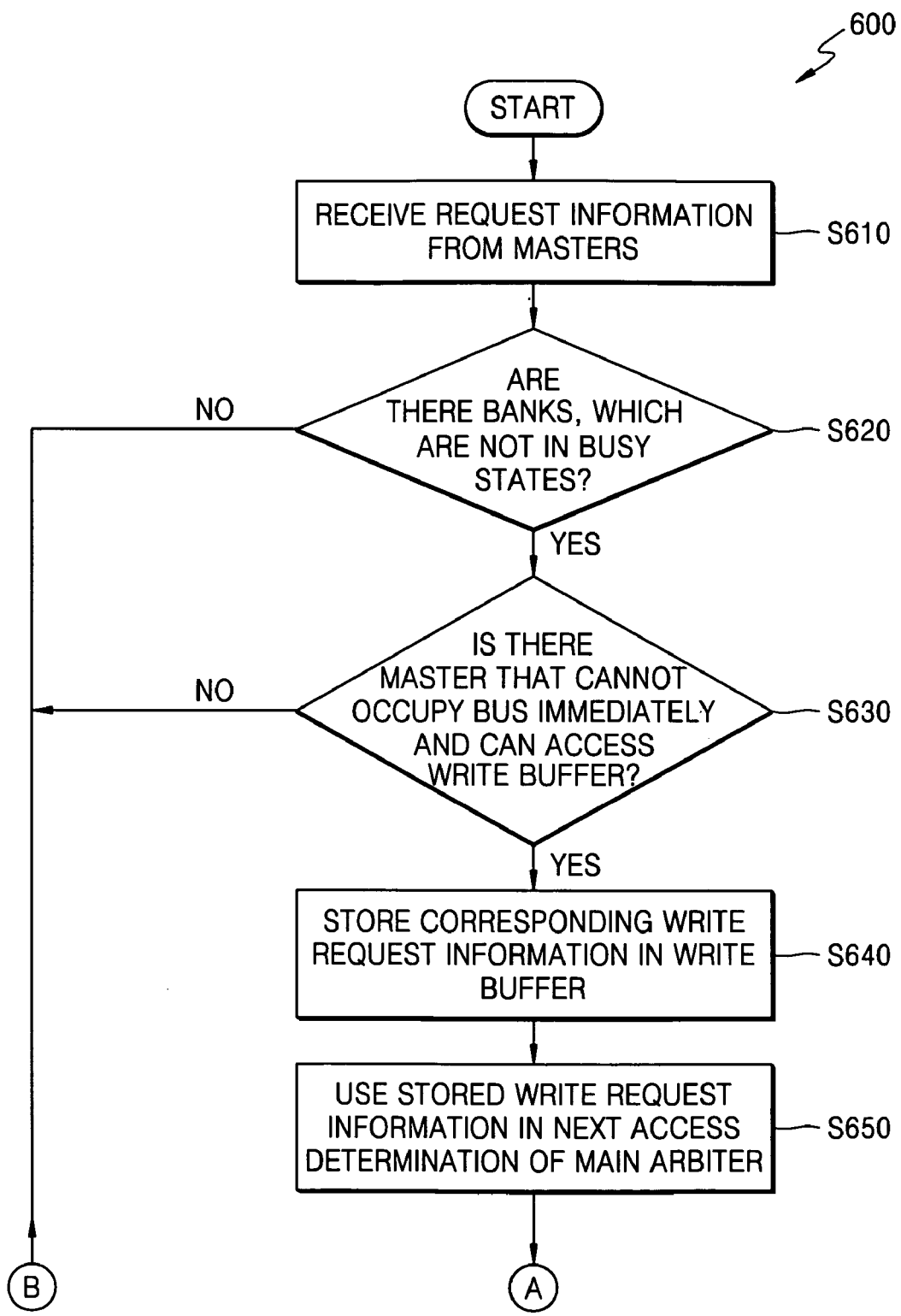
FIG. 6 is a flow chart describing operations of the arbiter shown in FIG. 5.
Figure 6B:
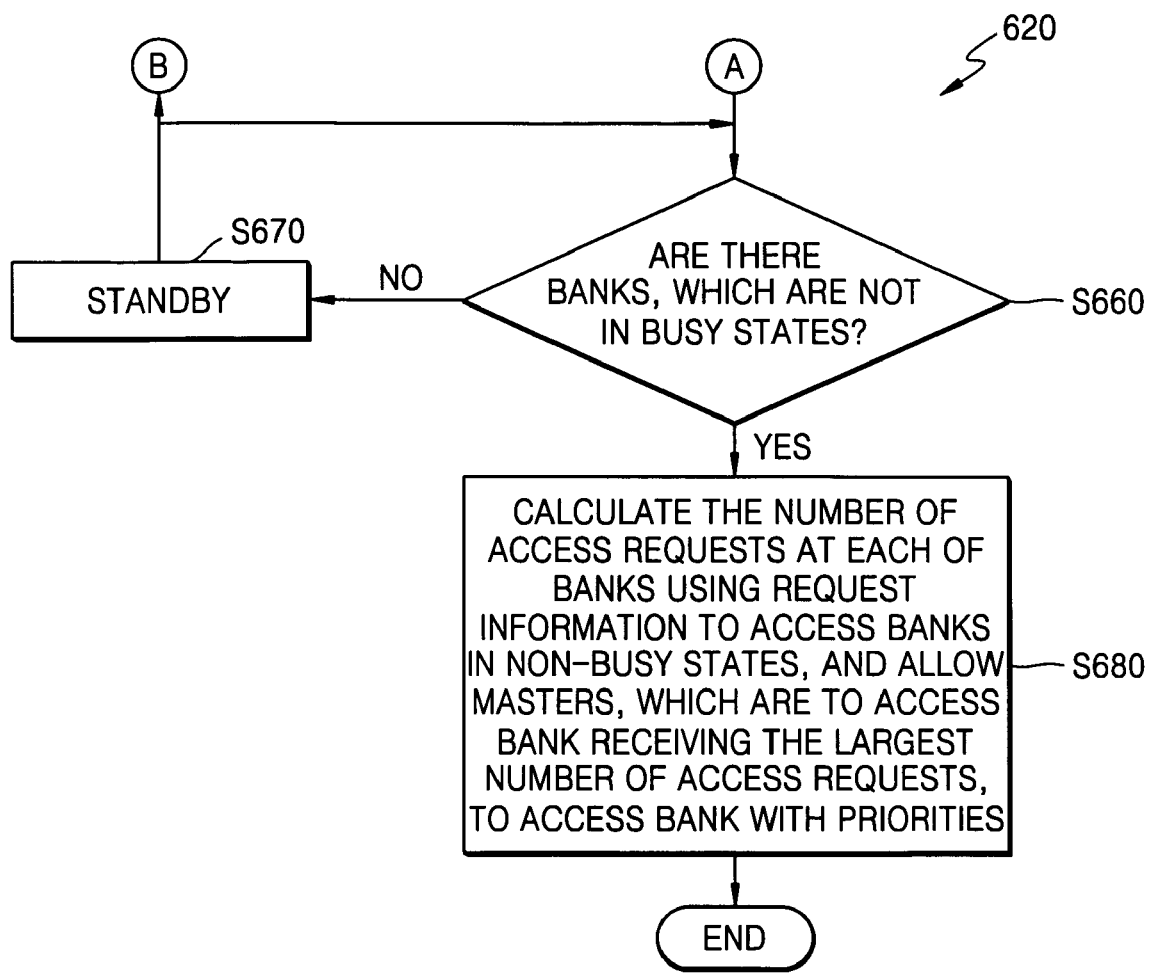

The main arbiter 223 detects the request information that is to access the banks, which are not in the busy states, among the request information $RI_1$-$RI_N$ output by the masters 211-213, and allows the masters 211-213 corresponding to the above request information and the write request information the access grants in a predetermined priority order. Accordingly, the main arbiter 223 outputs the request information SRI requested by the master that receives the access grant. Here, the main arbiter 223 calculates the number of access requests at each of the banks, which are not in the busy banks, using the request information $RI_1$-$RI_N$ in determining the access grants, and gives the access grants having higher priority to the masters that will access the bank having the largest number of access requests. FIGS. 6A and 6B show a flow chart describing operations of the arbiter 220 shown in FIG. 5, indicated generally by the reference numerals 600 and 620, respectively. Referring to FIG. 6A, in steps 610 and 620, when the arbiter 220 of FIG. 5 receives the request information $RI_1$-$RI_N$ from the masters 211-213, the arbiter 220 checks whether there is the write request information in the received request information $RI_1$-$RI_N$. Here, if there is the write request information and the write information is not processed directly by the access grant of the main arbiter 223 and can access the write buffer 222 presently, the sub-arbiter 221 stores the write request information including the write data in the write buffer 222, and the master that sends the corresponding write request performs write operation in the write buffer 222 (S630~S640). Accordingly, that master can send new bus request information. That is, the master generates new request information and outputs the request information besides the write request information stored in the write buffer 222 at next time (at next grant determination process). In step 650, the write request information $RI_{N+1}$-$RI_{N+M}$ temporarily stored in the write buffer 222 is output together when the request information $RI_1$-$RI_N$ is output from the masters 211-213 to the main arbiter 223, at the next grant determination of the main arbiter 223.

Accordingly, the main arbiter 223 allows the access grants in a predetermined priority order with respect to the request information $RI_1$-$RI_N$ output directly from the masters 211-213 and the write request information $RI_{N+1}$-$RI_{N+M}$ output by the write buffer 222, and selects the request information corresponding to the grants and outputs the SRI. The main arbiter 223 predicts a series of AT, during which the bank is controlled by the RAS, CAS, and the precharge control signal, and allows higher priority to the master that will access the bank, which is not in the busy state, like in FIG. 2. Thus, in step 660, when the main arbiter 223 receives the request information $RI_1$-$RI_{N+M}$, the main arbiter 223 checks whether there is the bank that is not in the busy state. In step 670, if the all banks in the multi-bank memory unit 240 are in the busy states, the accesses of the masters 211-213 are in the standby states. However, when there is the bank that is not in the busy state in the multi-bank memory unit 240, the main arbiter 223 grants the priorities to the request information $RI_1$-$RI_{N+M}$ output by the masters 211-213 as follows. That is, as described in FIG. 3, the number of access requests to each of the banks, which are not the busy banks, is calculated using the request information $RI_1$-$RI_{N+M}$, and the access grants having higher priorities are given to the masters that will access the bank receiving largest number of access requests in step 680. Accordingly, when the master receives the access grant having the highest priority, the main arbiter 223 selects the request information output by that master and outputs the SRI.

Figure 7A:
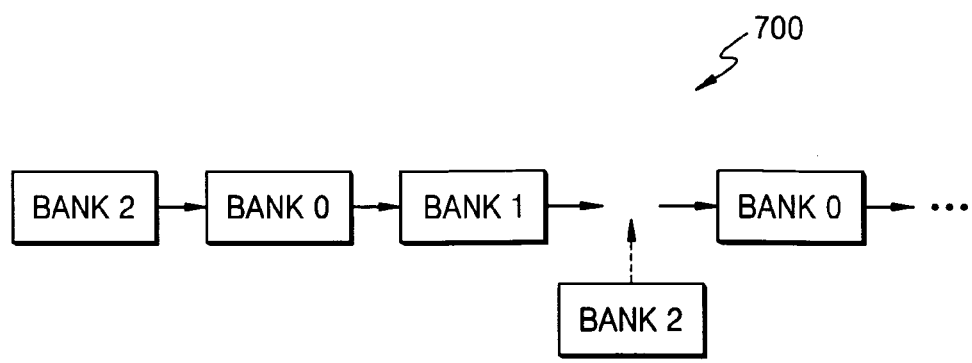
FIG. 7 is a view describing an operational method of the arbiter of FIG. 5 that arbitrates accesses to the multi-bank memory.
Figure 7B:
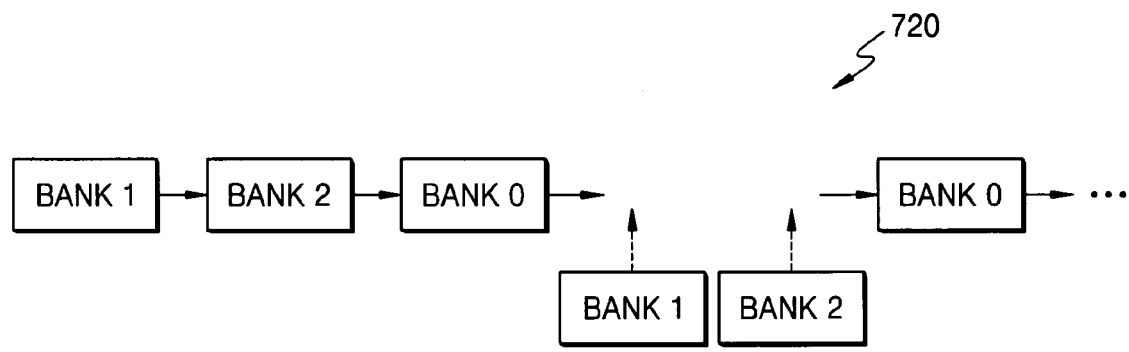

FIGS. 7A and 7B show a view describing operations of the arbiter 220 shown in FIG. 5, which performs the access arbitration process with respect to the multi-bank memory unit 240 and is indicated generally by the reference numerals 700 and 720, respectively.

Referring to FIG. 7A, in the case 700, if the banks are accessed in order of "bank2"-"bank0"-"bank1" and the bank 0 receives the access grant at next access grant determination process, the bank 0 is accessed again after 2AT is lapsed since the bank 0 is accessed first. Here, at the second access to the bank 0, the overhead cycle generates because it should be waited until the busy state of the bank 0 is released to access the bank 0 again. Here, it is assumed that the busy state of the bank is maintained for 3AT-period, as described in FIGS. 4A and 4B.

However, in a case where the write buffer 222 is used according to the present disclosure, the main arbiter 223 allows the master, which will access the bank 1, the access grant, and if there is the write request information $RI_{N+1}$-$RI_{N+M}$ output from the write buffer 222 at next access grant determination process, the overhead cycle may not be generated. That is, if there is the request information that will access the bank 2 among the write request information $RI_{N+1}$-$RI_{N+M}$ output from the write buffer 222 at the access grant determination process, the main arbiter 223 allows the access grant to the master that outputs the corresponding request information.

In FIG. 7B, in the case 720 where the banks are accessed in order of "bank1"-"bank2"-"bank0", if the bank 0 is to be accessed at the next access grant determination process, the bank 0 should be accessed again after 1AT is lapsed since the bank 0 is accessed first. Here, at the second access to the bank 0, the overhead cycle happens until the busy state of the bank 0 is released for 2AT period. However, if there is the request information that will access the bank 1 among the write request information $RI_{N+1}$-$RI_{N+M}$ output from the write buffer 222 at the next access grant determination process after the main arbiter 223 allows the access grant to the master, which is to access the bank 0, the main arbiter 223 allows the master that outputs the above request information the access grant not to generate the overhead cycle. Also, if there is the write request information that is to access the bank 2 in the write buffer 222 after the main arbiter 223 permits the access of the master that outputs the write request information to the bank 1, the main arbiter 223 gives the access grant to the master that outputs the above the write request information, and the overhead cycle is not generated.

As described above, the arbitration method, in which higher priorities are granted to the masters that want to access the bank receiving larger access requests and the write buffer 222 is used, makes the bank interleaving operation perform effectively. The above arbitration method can support the read/write turn-around time minimize method, and the same row access detection method as well as the bank interleaving method, thus improving the memory bandwidth.

The arbiter 220 according to the present disclosure detects the request information that is to access the banks besides the busy bank among the request information $RI_1$-$RI_N$ output from the masters 211-213, and allows the access grants to the masters 211-213 corresponding to the detected request information and the write request information $RI_{N+1}$-$RI_{N+M}$ in a predetermined priority order. In addition, in the access grant determination process, the arbiter 220 calculates the number of access requests to each of the banks, which are not the busy banks, from the request information $RI_1$-$RI_{N+M}$, and can grant higher priorities to the masters, which want to access the bank receiving the largest number of access requests.

As described above, an exemplary arbiter that arbitrates the multi-bank memory access according to the present disclosure detects the requests that are not the accesses to the busy bank, and grants the priorities to the requests corresponding to the bank receiving the largest number of pending requests. In addition, the write request information generated by the masters is stored in a predetermined buffer to be output as additional master request information, and the corresponding master can generate new request information. Accordingly, the arbiter effectively supports the bank interleaving method, the read/write turn-around time minimize method, and the same row access detection method to raise the memory bandwidth.

While the present invention has been particularly shown and described with reference to exemplary embodiments thereof, it will be understood by those of ordinary skill in the pertinent art that various changes in form and details may be made therein without departing from the spirit and scope of the present invention as defined by the following claims.

What is claimed is:

1. A multi-bank memory access arbiter in communication with a plurality of masters for receiving request information from the plurality of masters, storing write request information temporarily in a write buffer of the multi-bank memory access arbiter, and allowing the masters corresponding to the request information, which is received from the masters, to access a plurality of banks in communication with the multi-bank memory access arbiter, except a busy bank of the plurality of banks, and the temporarily stored write request information in the write buffer, in an access grant determination process, the multi-bank memory access arbiter comprising:

a sub-arbiter that receives the request information from the masters, selects and outputs the write request information;

the write buffer that stores the write request information temporarily; and a main arbiter that allows access grants to the masters corresponding to the request information for accessing the other banks except the busy bank in the request information output from the masters and to the write request information.

2. The arbiter of claim 1, wherein the main arbiter calculates a number of access requests at each of the banks, which are not the busy bank, using the request information received in the access grant determination process, and grants higher priorities to the masters, which will access the bank receiving a largest number of access requests.

3. The arbiter of claim 1, wherein the busy bank is accessed with lower priority than those of other banks, which are not in busy states.

4. The arbiter of claim 1, wherein the busy bank is the bank that is being accessed by one of the masters.

5. A multi-bank memory access arbitration system comprising:

a plurality of masters that output request information;

an arbiter that receives the request information from at least one of the plurality of masters, calculates a number of access requests from the request information for a plurality of banks except a busy bank, and grants the at least one master access to a bank of the plurality of banks receiving a largest number of access requests, to select and output the request information;

an interface control unit that processes the selected request information to output memory access control information; and a multi-bank memory unit that accesses the bank in response to the memory access control information to read data or write data.

6. The arbiter of claim 5, wherein the busy bank is accessed with lower priority than those of other banks, which are not in busy states.

7. The arbiter of claim 5, wherein the busy bank is the bank that is being accessed by one of the masters.

8. A multi-bank memory arbitration system comprising:
a plurality of masters that output request information;
an arbiter that receives the request information from the plurality of masters, stores write request information temporarily, and grants the masters access a plurality of banks except a busy bank, and the temporarily stored write request information, the arbiter selecting the request information corresponding to a master granted access and outputting a selected request information to the plurality of banks in an access grant determination process;
an interface control unit that processes the selected request information to output memory access control information; and
a multi-bank memory unit that accesses the bank in response to the memory access control information to read data or write data.

9. The system of claim 8, wherein the arbiter comprises:
a sub-arbiter that receives the request information from the masters, selects and outputs the write request information;
a write buffer that stores the write request information temporarily; and
a main arbiter granting the masters access to the plurality of banks except the busy bank and to the write request information.

10. The system of claim 9, wherein the main arbiter calculates a number of access requests at each of the plurality of banks that are not the busy bank, using the request information received in the access grant determination process, and grants higher priorities to the masters that will access the bank receiving a largest number of access requests.

11. A multi-bank memory access arbitration method comprising:
receiving request information from a plurality of masters;
calculating a number of access requests at each of a plurality of banks from the request information; and
giving a higher priority to a master granted access to a bank of the plurality of banks receiving a largest number of access requests.

12. The method of claim 11, further comprising:
selecting and outputting the request information corresponding to the access grant;
outputting memory access control information by processing the selected request information; and
accessing the bank in response to the memory access control information to read or write data.

13. The method of claim 11, wherein the busy bank is accessed with lower priority than that of other banks that are not in busy states.

14. The method of claim 11, wherein the busy bank is a bank that is being accessed by one of the masters.

15. A multi-bank memory access arbitration method comprising:
receiving request information from a plurality of masters;
storing write request information temporarily; and
granting the masters access to banks except a busy bank and the temporarily stored write request information.

16. The method of claim 15, further comprising:
selecting and outputting the request information corresponding to an access grant;
outputting memory access control information by processing selected request information; and
performing one of a read and a write of data after accessing the bank in response to the memory access control information.

17. The method of claim 15, wherein granting the masters access comprises:
calculating a number of access requests at each of the banks from the request information; and
given a higher priority to a master granted access a bank receiving a largest number of access requests.

18. The method of claim 15, wherein the busy bank is accessed with lower priority than that of other banks that are not in busy states.

19. The method of claim 15, wherein the busy bank is a bank that is being accessed by one of the masters.

* * * * *